United States Patent [19]
Mallon et al.

[11] Patent Number: 5,531,914
[45] Date of Patent: Jul. 2, 1996

[54] MAGNETIC COATING COMPOSITION

[75] Inventors: Charles B. Mallon, Belle Mead; James R. Harvey, Bridgewater; Claudio F. Nicolini, Princeton, all of N.J.

[73] Assignee: Union Carbide Chemicals & Plastics Technology Corporation, Danbury, Conn.

[21] Appl. No.: 369,302

[22] Filed: Jan. 6, 1995

Related U.S. Application Data

[63] Continuation of Ser. No. 34,973, Mar. 22, 1993, abandoned.

[51] Int. Cl.$^6$ ........................................ G11B 5/00
[52] U.S. Cl. .................. 252/62.54; 428/323; 428/425.9; 428/694 B; 428/694 BG; 428/522; 428/900
[58] Field of Search ..................... 428/694 B, 522, 428/694 BG, 900, 323, 425.9; 252/62.54

[56] References Cited

U.S. PATENT DOCUMENTS

| | | | |
|---|---|---|---|
| 2,607,710 | 8/1952 | Schmelzle et al. | 117/76 |
| 3,983,302 | 9/1976 | Zucker | 428/425 |
| 4,152,485 | 5/1979 | Mizumura et al. | 428/425 |
| 4,238,548 | 12/1980 | Okuyama et al. | 428/480 |
| 4,241,139 | 12/1980 | Kubota et al. | 428/413 |
| 4,323,628 | 4/1982 | Okuyama et al. | 428/425.9 |
| 4,340,644 | 7/1982 | Ota et al. | 428/423.7 |
| 4,352,859 | 10/1982 | Yoda et al. | 428/425.9 |
| 4,388,376 | 6/1983 | Kubota | 428/425.9 |
| 4,400,435 | 8/1983 | Yoda et al. | 428/425.9 |
| 4,409,291 | 10/1983 | Ogawa et al. | 428/425.9 |
| 4,411,957 | 10/1983 | Tokuda et al. | 428/425.9 |
| 4,414,288 | 11/1983 | Kawahara et al. | 428/694 |
| 4,423,115 | 12/1983 | Tokuda et al. | 428/425.9 |
| 4,429,010 | 1/1984 | Shibata | 428/425.9 |
| 4,431,712 | 2/1984 | Matsufuji et al. | 428/692 |
| 4,436,875 | 3/1984 | Janiga | 525/385 |
| 4,460,653 | 7/1984 | Azegami et al. | 428/425.9 |
| 4,476,035 | 10/1984 | Miyoshi et al. | 252/62.54 |
| 4,492,735 | 1/1985 | Ogawa et al. | 428/424.2 |
| 4,510,203 | 4/1985 | Ogawa et al. | 428/425.9 |
| 4,521,486 | 6/1985 | Ninomiya et al. | 428/407 |
| 4,529,661 | 7/1985 | Ninomiya et al. | 428/425.9 |
| 4,555,431 | 11/1985 | Miyatsuka | 428/141 |
| 4,560,616 | 12/1985 | Okita et al. | 428/423.1 |
| 4,568,613 | 2/1986 | Saito et al. | 428/425.9 |
| 4,571,364 | 2/1986 | Kasuga et al. | 428/336 |
| 4,576,726 | 3/1986 | Watanabe et al. | 252/62.54 |
| 4,576,866 | 3/1986 | Okita et al. | 428/336 |
| 4,578,311 | 3/1986 | Ishikuro et al. | 428/336 |
| 4,600,521 | 7/1986 | Nakamura et al. | 252/62.54 |
| 4,605,597 | 8/1986 | Ogawa et al. | 428/522 |
| 4,608,315 | 8/1986 | Yoda et al. | 428/425.9 |
| 4,612,244 | 9/1986 | Kaneda et al. | 428/323 |
| 4,613,545 | 9/1986 | Chubachi et al. | 428/328 |
| 4,619,855 | 10/1986 | Okita et al. | 428/143 |
| 4,621,027 | 11/1986 | Okita et al. | 428/425.9 |
| 4,634,632 | 1/1987 | Ogawa et al. | 428/425.9 |
| 4,637,959 | 1/1987 | Ninomiya et al. | 428/425.9 |
| 4,657,817 | 4/1987 | Okita et al. | 428/425.9 |
| 4,659,626 | 4/1987 | Fukushima et al. | 428/425.9 |
| 4,664,979 | 5/1987 | Yamada et al. | 428/413 |
| 4,672,002 | 6/1987 | Okita et al. | 428/425.9 |
| 4,677,030 | 6/1987 | Gerum et al. | 428/425.9 |
| 4,695,513 | 9/1987 | Hashimoto et al. | 428/425.9 |
| 4,699,844 | 10/1987 | Okita et al. | 428/425.9 |
| 4,731,292 | 3/1988 | Sasaki et al. | 428/425.9 |
| 4,734,330 | 3/1988 | Oiyama et al. | 428/411.1 |
| 4,743,501 | 5/1988 | Eguchi et al. | 428/328 |
| 4,748,081 | 5/1988 | Kobayashi et al. | 428/329 |
| 4,752,530 | 6/1988 | Yamada et al. | 428/425.9 |
| 4,783,370 | 11/1988 | Chernega et al. | 428/425.9 |
| 4,784,907 | 11/1988 | Matsufuji et al. | 428/328 |
| 4,784,914 | 11/1988 | Matsufuji et al. | 428/418 |
| 4,786,557 | 11/1988 | Kakuishi et al. | 428/418 |
| 4,788,103 | 11/1988 | Okita et al. | 428/425.9 |
| 4,789,590 | 12/1988 | Sato et al. | 428/323 |
| 4,798,755 | 1/1989 | Yamada et al. | 428/141 |
| 4,801,505 | 1/1989 | Ejiri et al. | 428/404 |
| 4,830,923 | 5/1989 | Sumiya et al. | 428/425.9 |
| 4,837,082 | 6/1989 | Harrell et al. | 428/329 |
| 4,840,842 | 6/1989 | Yamaguchi et al. | 428/323 |
| 4,847,156 | 7/1989 | Nishikawa et al. | 428/425.9 |
| 4,851,465 | 7/1989 | Yamakawa et al. | 524/431 |
| 4,865,924 | 9/1989 | Saito et al. | 428/694 |
| 4,871,606 | 10/1989 | Matsuura et al. | 428/147 |
| 4,876,149 | 10/1989 | Ramharack | 428/425.9 |
| 4,885,208 | 12/1989 | Araki et al. | 428/403 |
| 4,900,631 | 2/1990 | Yamakawa et al. | 428/483 |
| 4,910,089 | 3/1990 | Mitake et al. | 428/425.9 |
| 4,937,151 | 6/1990 | Yasuhara et al. | 428/694 |
| 4,983,311 | 1/1991 | Nakamura et al. | 252/62.54 |
| 5,013,602 | 5/1991 | Yamazaki et al. | 428/323 |
| 5,021,292 | 6/1991 | Imai et al. | 428/323 |
| 5,024,892 | 6/1991 | Watanabe et al. | 428/423.1 |
| 5,034,271 | 7/1991 | Miyoshi et al. | 428/323 |
| 5,066,539 | 11/1991 | Inoue et al. | 428/328 |
| 5,073,439 | 12/1991 | Hashimoto et al. | 428/328 |
| 5,085,941 | 2/1992 | Ohkubo | 428/424.6 |
| 5,091,238 | 2/1992 | Kato et al. | 428/64 |
| 5,093,172 | 3/1992 | Kato et al. | 428/64 |
| 5,093,191 | 3/1992 | Sano et al. | 428/323 |
| 5,093,192 | 3/1992 | Kawahara et al. | 428/323 |
| 5,094,910 | 3/1992 | Kaneno et al. | 428/329 |
| 5,094,916 | 3/1992 | Sasaki et al. | 428/425.9 |
| 5,096,774 | 3/1992 | Sano et al. | 428/323 |
| 5,116,683 | 5/1992 | Koyama et al. | 428/403 |
| 5,126,202 | 6/1992 | Inaba et al. | 428/402 |
| 5,147,720 | 9/1992 | Kawakami | 428/336 |
| 5,153,063 | 10/1992 | Okita et al. | 428/336 |
| 5,153,071 | 10/1992 | Watanabe et al. | 428/425.9 |
| 5,153,079 | 10/1992 | Sasaki et al. | 428/694 |

FOREIGN PATENT DOCUMENTS

| | | | |
|---|---|---|---|
| 0385715 | 9/1990 | European Pat. Off. | G11B 5/702 |
| 2584522 | 1/1987 | France . | |
| 60-144311 | 7/1985 | Japan . | |

Primary Examiner—Stevan A. Resan
Attorney, Agent, or Firm—W. K. Volles

[57] ABSTRACT

This invention relates to coating compositions used for forming a magnetic layer on the surface of substrates to prepare magnetic recording media, e.g., recording tapes, of which the characteristic ingredient is a copolymeric resin. The copolymeric resin is a copolymer obtained by the copolymerization of comonomers in a specified proportion including (1) vinyl chloride, (2) vinyl acetate, and (3) an acrylate or methacrylate moiety having a sulfonic acid group or a metal or amine salt thereof. This copolymeric resin is advantageous in respect of imparting enhanced dispersion and magnetic property characteristics while also having desirable rheological characteristics and thermal stability.

6 Claims, No Drawings

MAGNETIC COATING COMPOSITION

This application is a Continuation of prior U.S. application Ser. No. 08/034,973 filing date Mar. 22, 1993 now abandoned.

BRIEF SUMMARY OF THE INVENTION

1. Technical Field

This invention relates to coating compositions used for forming a magnetic layer on magnetic recording media and, in particular, to resins used as binder ingredients in the coating compositions capable of uniformly dispersing and suitable for binding particles of ferromagnetic materials.

2. Background of the Invention

Over the years, magnetic recording has come to occupy a vital place in a myriad of industries. Magnetic tape is accordingly utilized for audio, video, computer, instrumentation and other recordings. Magnetic recording media are utilized in a variety of forms, including, for example, magnetic cards and disks, reels, video tapes, high performance audio tapes, computer tapes, floppy disks and the like.

While there are several different types of magnetic recording media, most types consist of a layer of magnetic particles, sometimes referred to as "pigment", coated on a plastic, paper or metal base. Information to be recorded is stored in the magnetic pigment applied to the base as a series of small domains magnetized by a recording head. The coating layer of the magnetic pigment includes a binder system which provides a cohesive matrix between the magnetic pigment particles and adheres such particles to the base.

The magnetic coating is applied to the base by coating equipment such as, for example, a gravure roll coater, and the coated base then typically immediately proceeds to a magnetic orientation step wherein orientation of the pigment particles is effected on the undried layer. In this step, the long axis of the pigment particles, typically acicular crystals, is made to coincide with the magnetization direction.

In order to achieve good recording performance, the magnetic coating must possess a wide variety of characteristics. Pigment particles, desirably of relatively uniform particle size, should form as high a proportion of the coating layer as possible. Further, the degree of dispersion of the pigment particles in the coating, often evaluated as degree of gloss, should be as high as possible. Further, the highly dispersed pigment particles must be capable of being adequately oriented as previously described (the degree of orientation often measured as "squareness").

Still further, the adhesion and wear resistance of the magnetic coating or film should be high. Also, the coefficient of friction of the magnetic surface should be low against the head material, and yet have an adequate value against the driving media such as pitch rollers and capstan rollers.

Satisfying these and other diverse criteria have proven to require a delicate balance of basically reciprocal, or opposing, properties. A substantial amount of effort over the years has been directed to improving the various characteristics of magnetic recording media.

DISCLOSURE OF THE INVENTION

This invention is based on the discovery that a binder system for particulate matter, such as in magnetic recording media, which is capable of imparting desirable dispersion and magnetic characteristics and also has excellent rheological characteristics, may be provided by utilizing a copolymer of vinyl chloride, vinyl acetate and an acrylate or methacrylate having a sulfonic acid group —$SO_3H$ or a metal or amine salt thereof.

This invention relates to magnetic coating compositions for magnetic recording media which comprises, as dissolved or dispersed in an organic solvent:

(A) a copolymeric resin comprising the following monomeric moieties:
 (a) a first monomeric moiety of vinyl chloride of the formula —$CH_2$—CHCl—, preferably from 65 to 95 percent by weight;
 (b) a second monomeric moiety of vinyl acetate of the formula —$CH_2$—CH(O—CO—$CH_3$)—, preferably from 3 to 30 percent by weight; and
 (c) a third monomeric moiety of an acrylate or methacrylate having a sulfonic acid group —$SO_3H$ or a metal or amine salt thereof other than sulfomethyl methacrylate, preferably from 0.1 to 5 percent by weight; and (B) particles of a ferromagnetic material dispersed in the copolymeric resin as a vehicle.

DETAILED DESCRIPTION

This invention provides economical polymeric resins suitable for uniformly dispersing and firmly binding fine particles of a ferromagnetic material in a magnetic coating composition. This invention also provides coating compositions for forming magnetic layers on the surface of base films by using the above mentioned resins as binders of the ferromagnetic particles.

The polymeric resins provided by this invention as a binder of ferromagnetic particles in a coating composition for magnetic recording media is a copolymeric resin formed by the copolymerization of a monomeric mixture comprising (1) vinyl chloride, (2) vinyl acetate and (3) an acrylate or methacrylate moiety having a sulfonic acid or a metal or amine salt thereof.

The copolymeric resins are composed of monomeric moieties including (a) a first monomeric moiety of vinyl chloride of the formula —$CH_2$—CHCl—, (b) a second monomeric moiety of vinyl acetate of the formula —$CH_2$—CH(O—CO—$CH_3$)—, and (c) a third monomeric moiety of an acrylate or methacrylate having a sulfonic acid group —$SO_3H$ or a metal or amine salt thereof. The weight fractions of these monomeric moieties are, preferably, from 65 to 95 percent for (a), from 3 to 30 percent for (b), and from 0.1 to 5 percent for (c).

It is also preferable that the copolymer has an average degree of polymerization in the range from 200 to 800.

This polymeric resin is very advantageous as a matrix of the magnetic coating layer in respect of the high dispersibility of the ferromagnetic particles therein as well as high loadability with the ferromagnetic powder. In addition, the polymeric resin is fully compatible with polyurethane resins and the like conventionally used as a matrix resin of magnetic coating layers so that the coating composition of the invention can be prepared by using not only the above defined polymeric resin alone but also by the combined use thereof with other conventional resins with an object to improve the properties of the latter. Further, the coating composition of the invention can provide a magnetic coating layer having excellent characteristics both in the magnetic properties and the serviceability relative to the durability in service and thermal stability of the properties in the lapse of time.

The polymeric resin of the invention is obtained by copolymerizing the above described monomers in admixture to give a copolymer having an average degree of polymerization of 200 to 800. The polymeric resin is composed of monomeric moieties including:

(a) from 65 to 95 percent by weight of a first monomeric moiety of vinyl chloride of the formula —$CH_2$—CHCl—;

(b) from 3 to 30 percent by weight of a second monomeric moiety of vinyl acetate of the formula —$CH_2$—CH(O—CO—$CH_3$)—;

(c) from 0.1 to 5 percent by weight of a third monomeric moiety of an acrylate or methacrylate having a sulfonic acid group —$SO_3H$ or a metal or amine salt thereof; and (d) from 0 to 20 percent by weight of one or more other monomeric moieties.

The first monomeric moiety, i.e., the moiety derived from vinyl chloride, will generally be the major component that determines the adequacy of the mechanical properties necessary to appropriately function as a binder resin in magnetic recording media and the like. Accordingly, it is necessary to utilize an amount of vinyl chloride sufficient to provide the requisite properties for the resin, which properties can be adequately determined by reference to the Tg of the resin.

It is generally desired to utilize amounts of vinyl chloride adequate to provide the resins of this invention with a Tg of at least 40° C., preferably at least about 50° C., and more preferably at least about 70° C. It will accordingly be necessary to utilize a resin having at least about 70 percent by weight of vinyl chloride. More preferably, it is desirable to utilize about 80 to about 90 percent by weight of vinyl chloride. Amounts in excess of about 90 percent by weight may have inadequate solubility in conventional solvents. When the weight fraction of this monomeric moiety is too low, the coating layer formed from the coating composition may be somewhat poor in the mechanical properties. When the weight fraction thereof is too high, a difficulty is encountered in the preparation of the coating composition due to the decreased solubility of the polymeric resin in organic solvents.

The weight fraction of the second, i.e., vinyl acetate, monomeric moiety should be in the range from 3 to 30 percent. When the weight fraction of the vinyl acetate moiety is too large, a decrease is caused in the mechanical strengths and thermal stability of the coating layer formed from the coating composition affecting the durability of the magnetic recording medium prepared therewith.

The third monomeric moiety is an acrylate or methacrylate having a sulfonic acid group either in the free acid form or in the salt form with a metallic element or an amine. This monomeric moiety contributes to increase the dispersibility of the ferromagnetic particles in the coating composition. In this regard, the weight fraction thereof should be at least 0.1 percent although an excessively large weight fraction thereof over 5 percent has no particularly advantageous effect. The monomeric moiety of this type is introduced into the polymeric resin by the copolymerization of a monomer having an ethylenically unsaturated polymerizable group and a sulfonic acid group —$SO_3X$ in which X is a hydrogen atom, an atom of a metal such as alkali metals, or a protonated amine. Examples of suitable monomers include acrylates and methacrylates expressed by the following structural formulas, in which X is an atom of hydrogen, an alkali metal e.g., sodium and potassium, or a protonated amine: $CH_2$=CH—CO—O—$C_4H_8$—$SO_3X$; $CH_2$=C($CH_3$)—CO—O—$C_2H_4$—$SO_3X$; and the like.

Other monomeric moieties which may be employed in the polymeric resins of this invention include, for example, vinyl esters of carboxylic acids such as vinyl propionate; vinyl ethers such as methyl vinyl ether, isobutyl vinyl ether and cetyl vinyl ether; vinylidene halides such as vinylidene chloride and vinylidene fluoride; unsaturated carboxylic acids such as acrylic acid, methacrylic acid, maleic acid and itaconic acid; unsaturated carboxylic acid anhydrides such as maleic anhydride; esters of unsaturated carboxylic acids such as diethyl maleate, butylbenzyl maleate, dimethyl itaconate, methyl (meth)acrylate, ethyl (meth)acrylate and lauryl (meth)acrylate; unsaturated nitriles such as (meth)acrylonitrile; and aromatic vinyl compounds such as styrene, alpha-methylstyrene and p-methylstyrene.

The copolymeric resin obtained by the copolymerization of the above described comonomers should preferably have an average degree of polymerization in the range from 200 to 800. When the average degree of polymerization thereof is too small, no sufficiently high mechanical strengths as well as durability can be imparted to the magnetic recording media having the magnetic coating layer of the composition formulated with the copolymer. When the average degree of polymerization thereof is too large, the coating composition formulated with the copolymer in a desired concentration may have an increased viscosity to badly affect the workability with the coating composition.

The copolymerization reaction of the comonomers can be performed by any known method including the methods of suspension polymerization, emulsion polymerization, solution polymerization, bulk polymerization and the like. The vinyl acetate moiety in the copolymer can be replaced with vinyl propionate or other vinyl ester of a lower carboxylic acid, if so desired.

Conventional solution polymerization techniques may be desirably utilized, as will be discussed hereinafter, to form the binder resins of this invention. Similarly, other polymerization techniques such as conventional suspension or emulsion polymerization may also be used. Thus, the process employed for making the resins of this invention is not critical, and such technology is well understood by those in the art. Suitable preparative techniques are, for example, set forth in U.S. Pat. No. 3,755,271.

In general, and as an illustrative example, the resins of this invention may be prepared by utilizing solution polymerization, employing a solvent for the resulting resin as well as for the various components employed. Suitable solvents include, for example, the conventional ester solvents such as butyl acetate, ethyl acetate, isopropyl acetate, and the like, as well as the ketone solvents such as acetone, methyl ethyl ketone, methyl-n-butylketone, methylisopropylketone, and the like.

The polymerization may be carried out either batch-wise or continuously. Typically, the ratio of solvent/monomer will vary from about 0.3/1 to about 4/1, depending upon the molecular weight desired. The temperature selected may vary from about 35° C. to about 80° C., depending upon the reaction rate and resin molecular weight desired. Any oil-soluble, free radical catalyst may be used in an amount varying from about 0.01 to about 3.0%, based on the weight of the monomer. Suitable catalysts include, as illustrative examples, dibenzoyl peroxide, dilauroyl peroxide, azobisbutyronitrile and diisopropylperoxydicarbonate. Any pressure above the vapor pressure of the components of the system may be employed, pressures from about 30 to 100 psi being typical.

Any base or substrate may be utilized, and the particular substrate of choice will be dictated for the most part by the particular application. Polyethylene terephthalate and polypropylene films are in wide use as base materials for magnetic recording media. Where heat resistance is an important consideration, a polyimide film, polyamide film, polyarylether film, or the like may be utilized. In the case of a polyester film as a thin base, it is often used after monoaxial or biaxial orientation. It is likewise well known that pretreatment of the film may be beneficial to promote wetting and adhesion.

The magnetic particles may be any of those known and useful in conventional magnetic recording media. Representative examples include acicular or granular $\gamma Fe_2O_3$, $Fe_3O_4$, Co-doped $\gamma$-$Fe_2O_3$, Co-doped $\gamma Fe_2O_3$-$Fe_3O_4$ solid solution, Co-base-compound-adsorbed $\gamma$-$Fe_2O_3$, a Co-base-compound-adsorbed $Fe_3O_4$ (including those oxidized to an intermediate state between itself and $\gamma$-$Fe_2O_3$) and acicular $CrO_2$. (The term "Co-base compound" as used herein means cobalt oxide, cobalt hydroxide, cobalt ferrite, cobalt ion-adsorbates and the like which enable the magnetic particles to take advantage of the magnetic anisotropy of cobalt in improving its coercive force.) Also, the magnetic particle may be hexagonal or acicular strontium or barium ferrites. Also, the magnetic particle may be a ferromagnetic metal element or alloy, such as Co, Fe—Co, Fe—Co—Ni, or the like. Such a fine magnetic particle is prepared in a number of ways, including wet reduction of the starting material with a reducing agent such as $NaBH_4$, a treatment of the iron oxide surface with a Si compound and subsequent dry reduction with hydrogen gas or the like, and vacuum evaporation in a low-pressure argon gas stream. Fine particles of monocrystalline barium ferrite may be employed as well. The fine magnetic powder is used in the form of acicular or granular particles, depending on the application of the resulting magnetic recording medium.

It will be generally desirable to utilize a relatively large amount of magnetic particles in the coating layer. Typical compositions of the coating layer will thus include about 65 or 70 to about 85 or 90 percent magnetic particles, based upon the total weight of the coating layer. As is known, it is desirable to utilize pigment particles of relatively uniform size, with typically used particles having a long axis of about 0.4 micron or even less being employed.

The remainder of the coating layer will comprise the binder system, including the hardening resin, and typically an elastomeric polymer, optionally a dispersant, optionally a crosslinker and any optional auxiliary agents. Depending upon the resin of the present invention which is utilized, the dispersant as such may be minimized or even eliminated.

Conceptually, however, in addition to the pigment particles, the only additional essential component in accordance with this invention is the hardening resin itself. Typical coating layers will, however, often include the additional components identified depending upon the particular end use application. As is apparent from the amount utilized in typical formulations of the pigment particles, the remainder of the coating layer will generally represent about 10 or 15 to 30 or 35 percent by weight of the coating layer.

In the preparation of a magnetic coating composition by using the above described specific copolymer as a vehicle of the ferromagnetic particles, the copolymeric resin can be used in combination with other polymeric resins conventionally used in the manufacture of magnetic recording media in a minor, e.g. 50 percent by weight or smaller, amount. Examples of polymeric resins suitable for such a combined use include polyurethane resins, nitrocelluloses, epoxy resins, polyamide resins and phenolic resins as well as polymers and copolymers of acrylic and methacrylic acid esters, styrene, acrylonitrile, butadiene, ethylene, propylene, vinylidene chloride, acrylamide, vinyl ethers and the like, of which polyurethane resins and nitrocelluloses are particularly preferable.

In a preferred embodiment, the binder system will generally desirably include an elastomeric polymer in an amount sufficient to provide the coating layer with the desired resilience and the like. Many elastomeric polymers suitable for this purpose are known and may be utilized. Polyester urethanes are often preferred for high performance applications. Suitable materials are commercially available. These materials may be, in general, described as the reaction products of polyester polyols, short chain diols, and isocyanates. These resins have excellent toughness and abrasion resistance characteristics.

A wide variety of polyisocyanate crosslinkers are known and may be used. Typically, polymeric polyisocyanates are employed. As one example, it is suitable to use polymeric toluene diisocyanate (TDI) adducts. The amount of crosslinking agent used is typically about 1 to about 25 percent by weight of the amount of vinyl chloride copolymer and polyurethane in the formulation.

A polyisocyanate crosslinker is typically used in magnetic media formulations to improve properties such as hardness, tensile strength, glass transition temperature, etc. It is surprising that similar improvements are found in formulations containing the polymers described in this invention since these polymers contain no groups considered to be reactive towards isocyanates. While not wishing to be bound to any particular theory or mechanism, it is believed that at least some of the isocyanates may react with water to form amines which then react with other isocyanates to form an interpenetrating network. Such an interpenetrating network may contribute in part to the improved properties exhibited by the magnetic recording media formulations of this invention.

As is known, a variety of auxiliary agents are sometimes employed in the magnetic coating layer. Such additives are known and may be employed, if desired for the particular application. For example, the magnetic coating composition of the invention, which is basically a uniform dispersion of the ferromagnetic particles in the polymeric resin as the vehicle, may be further admixed with various kinds of known additives conventionally used in magnetic coating compositions including lubricating agents, dispersion aids, rust inhibitors, antistatic agents, leveling agents, wear resistant agents, film reinforcing agents and the like each in a limited amount. The magnetic coating composition may be diluted with an organic solvent to impart an adequate viscosity or consistency suitable for the coating procedure. Examples of suitable organic solvents include methyl ethyl ketone, methyl isobutyl ketone, toluene and the like.

In accordance with this invention, the magnetic coating layer utilizes the resins of this invention to provide the necessary dispersing and orientation characteristics of the coating, and to function as the hardening resin as well. No other hardening resin need be employed; however, if desired, the resins of the present invention can be utilized with compatible hardening resins to provide the desired magnetic coating layer.

In accordance with this invention, the use of the resins of the present invention should provide improved dispersion and orientation characteristics. However, if desired, other conventional dispersing agents may be employed.

The recording medium may generally be prepared by dissolving the binder system in a sufficiently volatile vehicle to provide a coatable dispersion of fine magnetizable particles. The dispersion can then be coated onto the substrate to provide a coating thereon. The magnetic recording medium may be prepared by methods described in the art such as in, for example, S. Tochihara, "Magnetic Coatings and Their Applications in Japan", Progress in Organic Coatings, 10 (1982), pages 195 to 204.

The inventive magnetic coating composition prepared in the above described manner can be applied to the surface of a substrate in the form of films, tapes, sheets, foils, plates and the like of various kinds of materials without particular limitations including synthetic resins such as polyesters, polyolefins, cellulose acetates, polycarbonates and the like, non-magnetic metals such as aluminum and ceramics. The coating procedure with the inventive magnetic coating composition can be performed by any known methods conventionally used in the manufacture of magnetic recording media followed by a surface treatment such as calendering to improve the smoothness of the coated surface required for a high-performance magnetic recording medium.

While use of the resins of the present invention provides highly advantageous properties in magnetic recording media and this invention has been described in conjunction with this application, it should be appreciated that such materials likewise can be utilized as dispersants and/or hardening resins in any other application where the characteristics of such resins could desirably be incorporated. For example, conventional zinc-rich coatings are useful in many applications which require corrosion resistance and the like. Such compositions typically comprise a high percentage of zinc particles (up to 85 to 90 percent by weight of the composition) and a resin together with such optional components as anti-settling agents, thickening agents and water scavengers, as is known. For zinc-rich maintenance coatings, and other clear and pigmented coatings, any of the resins of the present invention should provide improved dispersibility and thus improved adhesion to substrates. The resins of this invention can accordingly be readily utilized in conjunction with such coatings.

In the following, this invention is described in more detail by way of certain examples which show the preparation of the copolymeric resins and the application thereof to the manufacture of magnetic recording media.

EXAMPLES

The following examples are representative of this invention, and not in limitation thereof. The starting materials used, abbreviations employed, control resins evaluated, polymerization method used, the preparation of the magnetic media formulations, and the evaluation techniques utilized in the ensuing examples were as follows.

Abbreviations Used

The following abbreviations were used in the following examples:

VCl-vinyl chloride
VAc-vinyl acetate
SEMA-sulfoethyl methacrylate
HPA-hydroxypropyl acrylate
AMPS-2-acrylamido-2-methylpropanesulfonic acid
TPU-1-a thermoplastic polyurethane available from Morton International, Chicago, Ill., as Morthane CA-239.
TPU-2-a thermoplastic polyurethane available from Morton International, Chicago, Ill., as Morthane CA-236.
PIC-a polyisocyanate crosslinker available from Miles Inc., Pittsburgh, Pa., as Mondur CB-75.

Polymerization Procedure

Vinyl Chloride Copolymers

The vinyl chloride copolymers were produced via continuous solution polymerization in a stainless steel stirred tank reactor. Vinyl chloride and the other monomers used, as well as the solvent, were pre-mixed and fed continuously to the reactor. The free radical initiator, diisopropylperoxydicarbonate, was also fed continuously as an acetone solution, at a rate necessary to maintain constant conversion. Product solution was continuously withdrawn from the reactor. The temperature in the reactor was maintained at 50°–60° C. while the pressure was kept between 90–110 psi. The product solution was stripped of unreacted vinyl chloride monomer. Aqueous sodium carbonate was added to the acetone solution in a twofold excess based on the sulfonic acid. This converted the free sulfonic acid to the sodium salt prior to precipitation. The polymer was then recovered from solution by precipitation with an isopropanol/water mixture, filtered, and dried in a fluid bed drier.

Preparation of Magnetic Media Formulations

With metallic pigment:
High shear planetary mixer:

Metallic pigment (Dowa Mining Company, Ltd., Tokyo, Japan, H1Q-1, 469 grams) was charged to a Premier/Inoue 1.5 liter dual planetary mixer. A vinyl resin solution containing a vinyl chloride copolymer in Table I (322 grams of a 20% solids solution in a solvent blend of 1/1/1-methyl ethyl ketone/cyclohexanone/toluene) was added along with an additional 215 grams of the solvent blend. The contents of the mill were mixed for 20 to 24 hours to form a masterbatch which was about 53% solids.
Slush Grind:

The masterbatch (970 grams) was mixed with 499 grams of the solvent blend on a dispersator for about I hour to reduce the solids to 35 percent. This mixture was then charged to a Premier HML 0.75 liter horizontal mill containing 0.85 to 1.15 mm glass beads. Milling was continued until the formulation had made 3 passes through the mill.
Letdown:

The formulation was then discharged from the mill and mixed on a dispersator with 246 grams of a 20 percent solids solution of TPU-1 in the solvent blend. Additional solvent blend (41 grams) was also added to reduce solids to 32 percent. This blend was recharged to the mill and dispersed for 2 passes.

Overall, solids were 53 percent in the planetary mixer; 35 percent in the slush grind; 32 percent in the letdown. Final pigment/binder (vinyl chloride copolymer+TPU-1) was 80/20 by weight. The binder (vinyl chloride copolymer+TPU-1) was 55/45 by weight.
With Magnetite:

Formulations were prepared by premixing 18.25 grams of a vinyl resin in Table I below with 285 grams of a solvent blend of methyl ethyl ketone/toluene/cyclohexanone, at solvent blend ratios of 45/30/25, and adding 152 grams of magnetite ("Bayferrox PK 5143 M" magnetic pigment, Miles Inc., Pittsburgh, Pa.). After the mixture was well blended with an air stirrer for about 10 to 15 minutes, the resulting slurry was added to a Premier SME RE II Mill filled with 1.3 mm glass beads and milled for 45 minutes. TPU-2 was added to the formulation, 60.8 grams of a 20% solution in a solvent blend of methyl ethyl ketone/toluene/ cyclohexanone (45/30/25) being used. The formulation was then milled for 30 minutes.

Vinyl Chloride Copolymer Evaluations

Inherent Viscosity

This was determined according to ASTM D-1243.

Glass Transition Temperature (Tg), Tensile Strength and Elongation 18 grams of a vinyl resin identified in Table I were added into a glass jar. 40 grams of tetrahydrofuran, 15 grams of methyl ethyl ketone and 15 grams of toluene were then added into the jar. The jar was placed on rolls and the contents were rolled until dissolved. 12 grams of TPU-1 were then added into the jar. The jar was placed on rolls and the contents were rolled until dissolved. For crosslinked systems, 7.5 grams of PIC were added into the jar, the jar was placed on rolls and the contents were rolled until dissolved. The solutions coming off the rolls were full of air, and were allowed to settle before drawdowns were made.

The drawdowns for tensile properties were made on release paper using a 50 micron drawdown bar. The sample for glass transition temperature (Tg) measurement was made by adding 20 grams each of methyl ethyl ketone and toluene to the solution and rolling until uniform. This diluted solution was poured onto a Masslinn towel and spread with a tongue depressor. A glass rod was pulled across the towel to evenly distribute the solution. After 30 minutes drying, the solution was poured onto the towel again and spread as described above. Both the tensile strength and glass transition temperature (Tg) samples were dried in an air circulating oven for 48 to 72 hours at 60° C. This was followed by a final dry at 130° C. for 5 minutes. The samples were then tested in an Instron for tensile strength and elongation, and in a dynamic mechanical analyzer for glass transition temperature (Tg). Tensile strength and elongation samples were about 0.6 mm thick×1 inch gauge length. Crosshead speed: 0.5 inch/minute.

Magnetic Media Evaluations

Gloss

This was evaluated by preparing a 1 mil drawdown on glass, allowing the formulation to air dry and then measuring the gloss with a 60° gloss meter.

Other magnetic measurements were carried out using a LDJ Model 7000A B-H meter (LDJ Inc., Troy, Mich.) in applied fields of 3,000 or 5,000 Oersteds. Samples for these magnetic measurements were prepared by coating a 3 mil wet drawdown on a Mylar substrate and then pulling the Mylar across a bar magnet to orient the magnetic particles. A 2×2 inch sample of this oriented coating was used to measure its magnetic properties.

Switching Field Distribution

This was determined by measuring the width at half-height of the differentiated hysteresis loop and dividing it by the coercivity.

Orientation Ratio

This was determined as the ratio of the remanent flux density in the preferred (oriented) direction divided by the remanent flux density found in the plane of the coating but perpendicular to the preferred (oriented) direction.

Squareness Ratio

Magnetic squareness or squareness ratio was determined as the ratio of the remanent (Br) to maximum magnetic induction (Bm).

Examples 1–5 and Control Example A

Vinyl chloride copolymers were prepared having the compositions (weight percent) and viscosities set forth in Table I below.

TABLE I

|  | Examples |  |  |  |  | Control Example |
|---|---|---|---|---|---|---|
|  | 1 | 2 | 3 | 4 | 5 | A |
| Composition |  |  |  |  |  |  |
| VCl | 86 | 86 | 86 | 86 | 84 | 88 |
| VAc | 13.1 | 12.8 | 12.4 | 11.9 | 12.7 | 4 |
| HPA | — | — | — | — | — | 7 |
| SEMA | 0.9 | 1.2 | 1.6 | 2.1 | 3.3 | — |
| AMPS | — | — | — | — | — | 1 |
| Properties |  |  |  |  |  |  |
| Inherent Viscosity | 0.35 | 0.41 | 0.37 | 0.50 | 0.36 | 0.51 |

The copolymer of Control Example A was stored as a 25% solids solution in acetone at ambient temperature. Within days a haze developed that was obvious to the naked eye. After 50 days in solution, a sediment had formed on the bottom of the storage vessel. This sediment was collected and analyzed and found to be B,B-dimethyltaurine, $H_3N-C(CH_3)_2-CH_2-SO_3$. The polymer from the solution was recovered and analyzed for AMPS. The level was found to be about 20% below the level when it was originally put into solution. This demonstrates that the AMPS molecule was degrading in solution leading to the release of B,B-dimethyltaurine. The copolymers of Examples 1–5 containing sulfoethyl methacrylate showed no signs of degradation in solution.

Formulations containing certain of the vinyl resins in Table I, TPU-1 and PIC were prepared having the properties set forth in Tables II, III and IV below.

TABLE II

Glass Transition Temperature

| Formulation Prepared From Resin of Example | Tg, °C. | | |
|---|---|---|---|
| | Vinyl Resin | Vinyl Resin & TPU-1 | Vinyl Resin & TPU-1 & PIC |
| 1 | 76 | 68 | 78 |
| 2 | 74 | 67 | 76 |
| 3 | 76 | 64 | 78 |
| 4 | 77 | 66 | 77 |
| 5 | 77 | 63 | 80 |

TABLE III

Tensile Strength

| Formulation Prepared From Resin of Example | Tensile Strength, psi | | |
|---|---|---|---|
| | Vinyl Resin | Vinyl Resin & TPU-1 | Vinyl Resin & TPU-1 & PIC |
| 1 | 6400 | 5500 | 7700 |
| 2 | 6000 | 6500 | 7500 |
| 3 | 3600 | 4800 | 6400 |
| 4 | 6500 | 5500 | 8000 |
| 5 | 2100 | 3100 | 5100 |

TABLE IV

Elongation

| Formulation Prepared From Resin of Example | Elongation, percent | | |
|---|---|---|---|
| | Vinyl Resin | Vinyl Resin & TPU-1 | Vinyl Resin & TPU-1 & PIC |
| 1 | 10 | 200 | 180 |
| 2 | 120 | 260 | 260 |
| 3 | 2 | 170 | 200 |
| 4 | 150 | 160 | 180 |
| 5 | 1 | 50 | 90 |

Magnetic recording media were prepared using certain of the resins in Table I. The properties are set forth in Tables V and VI below.

TABLE V

Metallic Pigment

| Media Prepared From Resin of Example | 60° Gloss | Squareness Ratio | Switching Field Distribution | Orientation Ratio |
|---|---|---|---|---|
| 1 | 128 | 0.84 | 0.45 | 1.9 |
| 2 | 130 | 0.88 | 0.45 | 2.3 |
| 3 | 109 | 0.83 | 0.48 | 1.7 |
| 4 | — | — | — | — |
| 5 | 115 | 0.87 | 0.47 | 2.3 |

TABLE VI

Magnetite

| Media Prepared From Resin of Example | 60° Gloss | Squareness Ratio | Switching Field Distribution | Orientation Ratio |
|---|---|---|---|---|
| 1 | — | — | — | — |
| 2 | 96 | 0.88 | 0.38 | 2.1 |
| 3 | 88 | 0.87 | 0.40 | 2.0 |
| 4 | 98 | 0.88 | 0.41 | 2.0 |
| 5 | 94 | 0.89 | 0.39 | 2.0 |

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

We claim:

1. A magnetic coating composition for a magnetic recording medium which comprises, as dissolved or dispersed in an organic solvent:
   (A) a copolymeric resin consisting essentially of the following monomeric moieties:
      (a) from 65 to 95 percent by weight of a first monomeric moiety of vinyl chloride of the formula —$CH_2$—CHCl—;
      (b) from 3 to 15 percent by weight of a second monomeric moiety of vinyl acetate of the formula —$CH_2$—CH—(O—CO—$CH_3$)—; and
      (c) from 0.1 to 5 percent by weight of a third monomeric moiety of an acrylate or methacrylate having a sulfonic acid group —$SO_3H$ or a metal or amine salt thereof other than sulfomethyl methacrylate; and
   (B) particles of a ferromagnetic material dispersed in the copolymeric resin as a vehicle.

2. The magnetic coating composition of claim 1 further comprising a thermoplastic polyurethane.

3. The magnetic coating composition of claim 1 further comprising a polyisocyanate crosslinker.

4. The magnetic coating composition of claim 1 further comprising a lubricating agent, dispersion aid, rust inhibitor, antistatic agent, leveling agent, wear resistant agent or film reinforcing agent.

5. The magnetic coating composition of claim 1 wherein the copolymeric resin as the component (A) has an average degree of polymerization in the range from 200 to 800.

6. The magnetic coating composition of claim 1 wherein the amount of the copolymeric resin as the component (A) is in the range from 8 to 30 parts by weight per 100 parts by weight of the particles of the ferromagnetic material as the component (B).

* * * * *